(12) United States Patent
Jansma

(10) Patent No.: US 9,090,816 B2
(45) Date of Patent: *Jul. 28, 2015

(54) FLUORESCENT LAMP PHOSPHOR RECYCLING

(75) Inventor: Jon Bennett Jansma, Pepper Pike, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 257 days.

This patent is subject to a terminal disclaimer.

(21) Appl. No.: 13/606,143

(22) Filed: Sep. 7, 2012

(65) Prior Publication Data

US 2014/0072486 A1 Mar. 13, 2014

(51) Int. Cl.
*C01F 17/00* (2006.01)
*C09K 11/01* (2006.01)

(52) U.S. Cl.
CPC ....................................... *C09K 11/01* (2013.01)

(58) Field of Classification Search
CPC ..................................................... C09K 11/01
USPC ........... 252/301.4 R, 301.4 P, 301.4 H; 445/2
See application file for complete search history.

(56) References Cited

U.S. PATENT DOCUMENTS

| 8,851,950 B2* | 10/2014 | Jansma et al. ................... 445/2 |
| 2002/0180339 A1 | 12/2002 | Jansma |
| 2011/0206580 A1 | 8/2011 | Porob et al. |
| 2012/0152062 A1 | 6/2012 | Gourishankar et al. |

FOREIGN PATENT DOCUMENTS

| DE | 2235295 A1 | 1/1974 |
| DE | 19918793 A1 | 11/2000 |
| EP | 0453685 A1 | 10/1991 |

OTHER PUBLICATIONS

PCT Search Report and Written Opinion dated Sep. 3, 2013 from corresponding Application No. PCT/US2013/052640.

* cited by examiner

*Primary Examiner* — Carol M Koslow
(74) *Attorney, Agent, or Firm* — GE Global Patent Operation; Peter T. DiMauro

(57) ABSTRACT

A method is provided for recovering phosphor materials from fluorescent lamps. Particles created from the lamps are washed by mixing with water and carboxylic (e.g., acetic) acid while controlling the temperature. The carboxylic acid reacts with basing cement, particularly calcium carbonate, without significant reaction with the phosphors. After this reaction, the phosphors can be removed and e.g., reused in the production of fluorescent lamps.

20 Claims, 2 Drawing Sheets

FLUORESCENT LAMP PHOSPHOR RECYCLING

FIELD OF THE INVENTION

The subject matter of the present disclosure relates generally to the recycling of phosphors from fluorescent lamps.

BACKGROUND OF THE INVENTION

Fluorescent lamps are typically constructed from a sealed glass tube that contains a small amount of mercury and an inert gas such as argon, xenon, neon, or krypton. Electrodes made of e.g., coiled tungsten are placed at different ends of the tube and are connected with an electrical circuit. When the mercury is properly vaporized within the lamp tube, applying a sufficient voltage difference across the electrodes will cause a current to flow through the gas in the tube thereby exciting the gas molecules and causing a release of photons—albeit in the form of short wave, ultraviolet light—a wavelength that does not provide the visible light that is desired.

The inside of the gas tube is coated with phosphors—i.e. substances that can luminesce or give off light. More particularly, these phosphors are commonly applied as a paint-like coating to the inside of the tube. Organic solvents in the applied coating are allowed to evaporate leaving behind the phosphors. The tube may also be heated to remove residual solvent and fuse the coating to the lamp tube.

Photons released from the excited gas are absorbed by this coating of phosphors. In turn, the phosphors also emit photons but at a longer wave length than the photons released from the excited gas and, more importantly, at a wavelength that provides visible light. Variables such as the length of the glass tube determine how much visible light is provided by a particular lamp.

Advantageously, the fluorescent lamp converts the electrical energy supplied to its electrodes into a useful light more efficiently than a traditional incandescent lamp. In fact, much of the energy supplied to an incandescent lamp is lost in the form of heat. As a result, the fluorescent lamp is relatively less expensive to operate than an incandescent. Although the initial cost of a fluorescent is somewhat higher due to a ballast that is required in order to regulate the current, this cost is typically recovered in saved energy costs. Thus, the use of fluorescent lamps has become ubiquitous particularly in commercial applications.

For various reasons, after a period of use, fluorescent lamps eventually require replacement. By way of example, the electrodes may eventually fail, the small amount of mercury in the tube may absorb into the glass, the efficiency of the phosphors in absorbing and emitting photons may decrease, and other reasons may require replacement as well. As a result, a significant amount of fluorescent lamps must be disposed of each year.

The phosphors used in fluorescent lamps are typically rare earth compounds of various types. For example, europium-doped yttrium oxide is widely used in fluorescent lamps as a red-emitting phosphor. Yttrium oxide that has been doped with other lanthanide series rare earth metals can also be used. A blend of phosphors, sometimes referred to as a triphosphor blend, is commonly used to provide white light from e.g., a red-emitting phosphor, a green-emitting phosphor, and a blue-emitting phosphor.

While the amount of phosphors used in producing an individual fluorescent lamp is relatively small, these phosphors are valuable materials. As such, recycling phosphors from discarded fluorescent lamps is desirable. Unfortunately, certain challenges are presented in attempting to reclaim these phosphor materials.

For example, the phosphors must be separated from multiple other materials that are used in the construction of the fluorescent lamps. These other materials can include glass used in constructing the tube, metals for the electrodes and other components, and plastics for parts such as a lamp base. Another component that can present particular problems is a basing cement, typically containing primarily calcium carbonate, that is used to attach a base to an end of the sealed tube. This basing cement can be present in small amounts similar to the amount of phosphors that are present. However, the phosphors must be separated from the basing cement for successful recycling of the phosphors.

Accordingly, a process for the recycling of phosphors from fluorescent lamps would be useful. More particularly, a process for separating phosphors from the calcium carbonate in the basing cement used in fluorescent lamps would be beneficial. Such a process that can be used with a variety of different phosphors would also be particularly useful.

BRIEF DESCRIPTION OF THE INVENTION

The present invention provides a method for recovering phosphor materials from fluorescent lamps. Particles created from the lamps are washed by mixing with aqueous carboxylic acid (e.g., water and acetic acid) while controlling the temperature. The carboxylic acid reacts with basing cement, particularly calcium carbonate, without significant reaction with the phosphors. After this reaction, the phosphors can be removed and e.g., reused in the production of fluorescent lamps. Additional aspects and advantages of the invention will be set forth in part in the following description, or may be apparent from the description, or may be learned through practice of the invention.

In one exemplary aspect, the present invention provides a method for phosphor recycling. This exemplary method may include the step of providing particles created from phosphor-coated tubes of fluorescent lamps. This exemplary method includes the steps of: preparing a mixture comprising aqueous carboxylic acid and the particles; reacting the carboxylic acid with basing cement present in the mixture; maintaining the mixture at a temperature of $T_{MAX}$ or less; and separating one or more phosphors from the mixture.

In another exemplary aspect, the present invention provides another method for recovering phosphors from fluorescent lamps. This exemplary method may include the step of creating particles from the lamps. This exemplary method includes the steps of: mixing the particles with water to provide a mixture; adding carboxylic acid to the mixture while keeping the temperature of the mixture below a predetermined maximum temperature $T_{MAX}$; and separating one or more phosphors from the mixture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
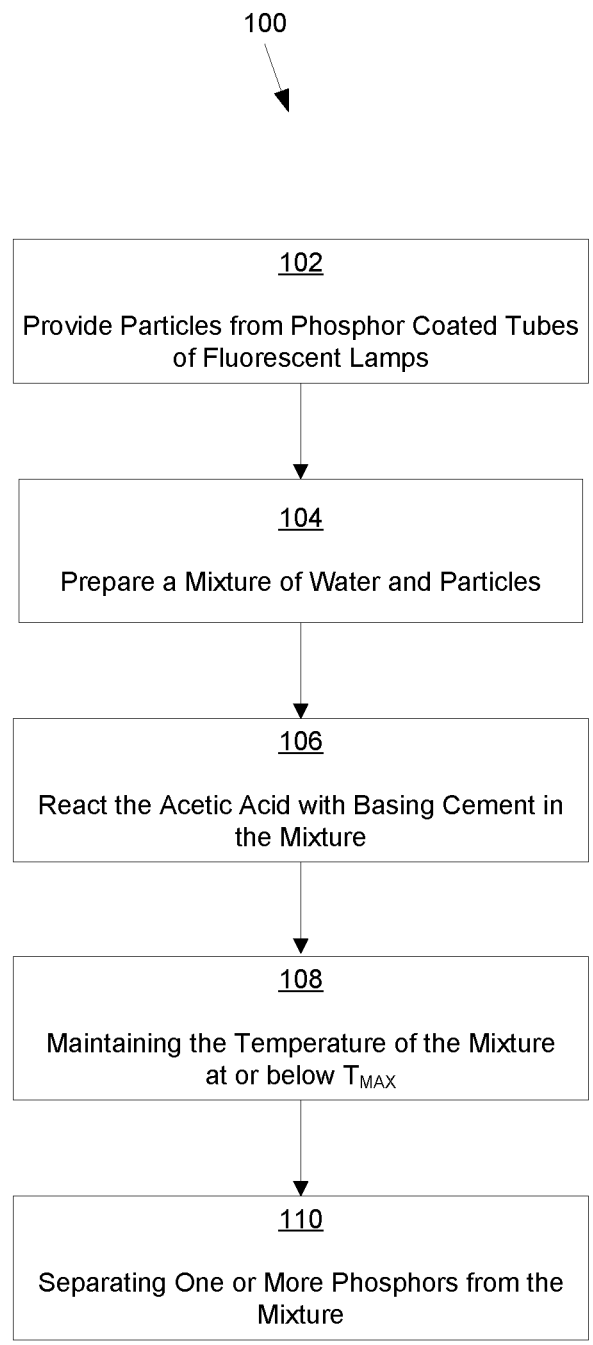
FIG. 1 illustrates an exemplary method of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a flowchart illustrating an exemplary method 100 of the present invention. In step 102, particles from phosphor coated tubes of fluorescent lamps are provided. By way of example, the particles can be provided as powders created by crushing spent fluorescent lamps collected from a recycling center. Separate collection containers can be provided at waste collection centers into which the spent fluorescent lamps are placed. These lamps can then be collected, treated to remove mercury, and converted into a powder that includes particles of phosphors, glass, basing cement, and metal impurities from the spent lamps and the equipment used to crush and separate them. These particles can be screened or dry sifted to remove oversized or larger particles. For example, particles with at least one dimension of about 20 microns or greater may be removed with a 520 mesh screen size. One or more additional steps can also be applied to further remove unwanted materials from the particles as desired.

Next, in step 104, a mixture is created by adding together the particles, water, and a carboxylic acid such as acetic acid. Typically, the carboxylic acid may comprise at least one of acetic acid, propionic acid, butanoic acid, or mixtures thereof; or the like. Step 104 can be accomplished in several different ways. For example, the mixture can be prepared by delivering the particles into the water and providing agitation to disperse the particles and create a slurry. The carboxylic acid can then be added to the slurry. Alternatively, the water and carboxylic acid can be combined with the particles in a single step. Step 104 can also be referred to as a step of washing the particles in the carboxylic acid and water.

The carboxylic acid reacts with the basing cement in the slurry in step 106. During this step, the mixture can also be continuously agitated. As indicated previously, the basing cement found in the particles contains mostly calcium carbonate which must be separated from the phosphors for effective recycling. For example, acetic acid is a self-buffering, relatively weak acid that will rapidly react with the basing cement without also dissolving a significant amount of the phosphors. Stronger acids will also react with basing cement but will also undesirably dissolve a substantial amount of the phosphors.

The amount of carboxylic acid to use with the mixture can be determined by several methods. For example, the amount of basing cement present in the particles can be estimated and used to calculate the amount of carboxylic acid needed to react with all of the basing cement present. In one exemplary aspect, enough acetic acid is added to obtain a 1 molar concentration of acetic acid in the mixture of the particles and water.

In another exemplary aspect, carboxylic acid can be added to the mixture until the pH stabilizes. For example, the particles and water can be combined in a batch reactor. The pH is measured repeatedly while carboxylic acid is added to the mixture and provided with agitation. The initial additions of carboxylic acid will combine with the basing cement without significantly lowering the pH of the mixture. However, as more carboxylic acid is added to the mixture and the basing cement present diminishes by reacting with the acid, the pH will begin to drop and then stabilize. For example, the pH may stabilize in a range of about 3 to 4—indicating that no additional carboxylic acid is needed. Other methods may be used to determine the amount of carboxylic acid used in the mixture to react with the basing cement as well.

The inventor has also determined that controlling the temperature of the mixture has a substantial effect on reacting the carboxylic acid with the basing cement and particularly in limiting the reaction with the phosphors. Accordingly, as indicated by step 108, the temperature of the mixture is maintained at or below at certain maximum temperature $T_{MAX}$. In one exemplary embodiment, temperature $T_{MAX}$ is about 30° C. or less. In another exemplary embodiment, temperature $T_{MAX}$ is about 25° C. or less. In still another exemplary embodiment, temperature $T_{MAX}$ is about 20° C. or less. Alternatively, the temperature of the mixture can be maintained within a certain range such as e.g., about 20° C. to about 30° C.

Different techniques may be used to maintain the temperature of the mixture below temperature $T_{MAX}$ or within the range desired. For example, one or both of the water and carboxylic acid can be cooled prior to adding to the mixture. Using, for example, a batch type reactor with a heat transfer jacket also allows the mixture of water and particles to be cooled and maintained at the proper temperature while the carboxylic acid is added. Other techniques may be used as well.

In step 110, one or more phosphors present in the mixture are removed. Because the phosphors will not react significantly with the carboxylic acid if the temperature is controlled, the phosphors will settle as solids upon discontinuing agitation of the mixture. By way of example, a centrifuge can then be used to apply centrifugal forces to further settle the phosphor solids. The liquid can then be decanted from the mixture. Alternatively, or in addition thereto, a vacuum can be applied to remove liquid from the mixture. Other techniques may also be used to separate the phosphor solids.

One or more washing steps can be used to further separate the phosphor solids. For example, the phosphor solids can be washed one more times with e.g., deionized water. Any remaining carboxylic acid (e.g., acetic acid) or reaction products of the carboxylic acid and basing cement can be removed by these washing steps.

The exemplary method 100 as described can be successfully used to remove the phosphors, particularly e.g., yttrium-europium oxide. Other phosphors such as strontium, europium chlorapatite (SECA) phosphors; barium europium magnesium aluminate (BAM) phosphors, or combinations thereof may be removed as well.

As will be understood by one of skill in the art, the present invention is not limited to the steps or order shown in FIG. 1 as method 100 and other variations and/or steps may also be used. The following examples are provided by way of explanation and illustration only and are not to be construed as limiting the invention.

EXAMPLE 1

Recycled lamp phosphor was obtained from Bucyrus Lamp Plant of Bucyrus, Ohio. The lamp phosphor was obtained directly from an end-cut type recycling process where phosphor is blown into a cyclone collector and retorted to remove mercury. The phosphor was obtained primarily from Polylux type T8 lamps.

A phosphor sample, approximately 5 kilograms in size, was dry sifted to remove glass and oversize contaminants using a 325 mesh screen, then washed repeatedly in a mixture of water and acetic acid prior to making into coating for construction of F32T8 type fluorescent lamps. All coating formulations, lamp coating and lamp making were done in the same manner for each wash treatment compared in TABLE I below.

TABLE I shows washing variations, for 500 gram lots of the original 5 kilogram sample, performed with water, room temperature (i.e. cold) acetic acid solution, and with relatively hot acetic acid solution. The concentration of acetic acid in the wash solutions was 10% on a weight basis and 700 grams of solution was used to treat 500 grams of recycled phosphor.

TABLE I

Summary of acetic acid washed cells

| Wash No. (8 lamp sample size) | Chromaticity (100 hr) | | Calculated phosphor fractions (from chromaticity) | | |
|---|---|---|---|---|---|
| | X | Y | Red | Green | Blue |
| Wash No. 1 | 0.3553 | 0.3583 | 0.315 | 0.489 | 0.197 |
| Wash No. 2 | 0.3534 | 0.3574 | 0.310 | 0.490 | 0.200 |
| Wash No. 3 | 0.3045 | 0.3707 | 0.133 | 0.632 | 0.235 |

Wash No. 2, the "cold" condition, was held at room temperature (21 to 22° C.) for 24 hours. Wash No. 3, the "hot" wash condition, was heated using a microwave oven to achieve 85° C. for a few minutes, followed by cooling with gentle agitation. Both the hot and cold acetic acid treatments were removed by repeated mixing with fresh deionized water, sedimentation of phosphor, and decantation of the supernatant. This water wash procedure was repeated five times to assure complete removal of the acid solution prior to reconstitution into lamp coating.

The wet, washed phosphor was finally reworked into a lamp coating dispersion by adding the following ingredients for a 500 gram phosphor quantity:
1) 500 grams polyethylene oxide solution, 5%, made using Polyox™ N3000 (Dow Chemical Company, Houston, Tex.);
2) 10 grams surfactant, 5%, made from Pluronics™ F108 (PEO-PPO copolymer type—nonionic) (BASF, Florham Park, N.J.);
3) 84 grams fumed alumina dispersion, 12% by weight, made from Cabot Spectral™ 81 alumina (Cabot Corporation, Boston Mass.).
4) water to adjust coating viscosity (to achieve 2.7 grams coating weight for a standard F32T8 lamp bulb).

The above additives were added with mixing to assure a homogeneous blend with minimal foam. Lamp tubing was coated using this reconstituted phosphor coating in the usual manner and made into F32T8 lamps using a standard process.

Fluorescent lamps made from the cold acetic acid Wash No. 2 in Table I showed little shift in color from the control sample Wash No. 1 washed only with deionized water. Lamps made from hot acetic acid Wash No. 3 showed much less presence of red because of the reaction with the yttrium-europium oxide (YEO) or red phosphor. More than half of the original red phosphor is lost due to the hot acetic acid washing as indicated in TABLE I.

Gravimetric measurements of total phosphor remaining after the wash treatments indicated approximately 15% of the total phosphor was lost (mostly red) due to the hot acetic acid treatment. This result supports the significant loss of YEO or red phosphor during the hot acetic acid wash treatment, which does not occur or occurs to a much lower extent for the room temperature acetic acid wash.

Accordingly, these experimental results suggest that acetic acid mixtures at about room temperature or cooler may be used to recover phosphors without significant loss of the YEO or red phosphor. More specifically, acetic acid can be used to react readily with the basing cement—particularly calcium carbonate—and provide for removal of the same without significant loss of the YEO or red phosphor. This advantageous result is even more significant at lower temperatures as indicated with the next example.

EXAMPLE 2

In order to better quantify the rate of dissolution of YEO or red phosphor in dilute acetic acid solutions as a function of time and temperature, the following experiment was performed. A thermostatically controlled mixing vessel, lined with glass and contacted by stainless steel components, was arranged to control temperature while mixing a slurry of YEO phosphor and dilute acetic acid solution. The following recipe was chosen for the proportions:

| 1) Water | 1500 grams (cubic centimeters) |
|---|---|
| 2) Phosphor | 54 grams |
| 3) glacial acetic acid | 90 grams |

The phosphor and water were first mixed. The temperature was adjusted to the desired level and stabilized using the thermostatically controlled heating/cooling unit. Once the temperature stabilized, the acetic acid was added and the timed test began. Small samples of the dispersion were removed at the times indicated in the graph shown in FIG. 2, cooled, and then separated using a centrifuge. The supernatant water solution was checked, by gravimetric methods, for yttrium acetate content, which is shown plotted in FIG. 2 on the y-axis.

The gravimetric method involved filling a weighed crucible with solution, weighing the crucible with the solution, drying in an oven at 80° C., and weighing again when cool. All weights were determined using an analytical balance capable of measuring to the nearest 0.0001 grams. The phosphor was not completely dissolved—as indicated by a white turbid slurry in the main mixing and temperature controlled chamber.

Figure 2:
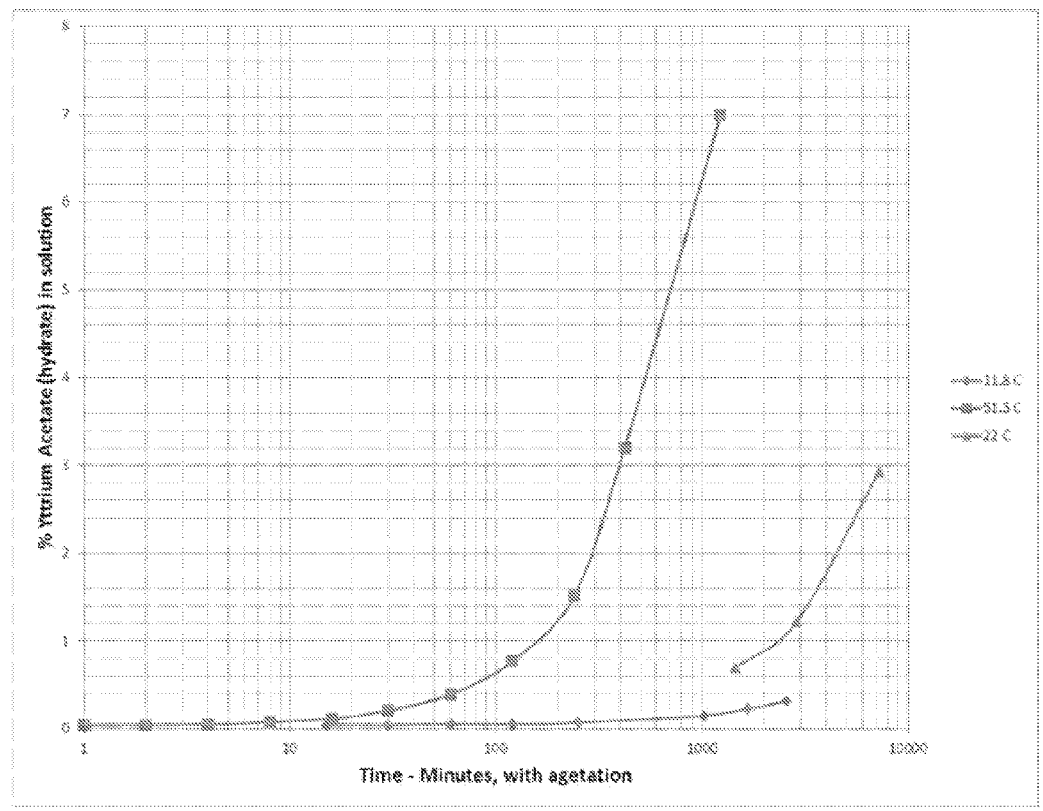
FIG. 2 provides plots of phosphor concentrations as a function of time at different temperatures as further described herein.

Referring to the plot in FIG. 2, the role of temperature is significant. The amount dissolved at 1000 minutes (17 hours) was approximately 100 times greater for the 51.5° C. temperature compared with 11.8° C. Thus, keeping the washing process cool provides a strong benefit for acetic acid washing. Room temperature (about 22° C.) indicated an intermediate dissolution rate—still significantly faster than the cooler 11.8° C. Thus, an advantageous and unexpected result occurs from controlling the temperature during the mixing or wash process so as to minimize the loss of valuable YEO or red phosphor when extracting calcium carbonate and other contaminants in the process of reclaiming recycled phosphors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for phosphor recycling, comprising:
    preparing a mixture comprising aqueous carboxylic acid and particles created from phosphor-coated tubes of fluorescent lamps;
    reacting the carboxylic acid with basing cement present in the mixture;
    maintaining the mixture at a temperature of $T_{MAX}$ or less, wherein $T_{MAX}$ is about 30 degrees Celsius; and
    separating one or more phosphors from the mixture.

2. A method for phosphor recycling as in claim 1, wherein the temperature $T_{MAX}$ of said step of maintaining is about 25 degrees Celsius or less.

3. A method for phosphor recycling as in claim 1, wherein the temperature $T_{MAX}$ of said step of maintaining is about 20 degrees Celsius or less.

4. A method for phosphor recycling as in claim 1, further comprising the steps of:
    measuring the pH of the mixture and, if the pH of the mixture has not stabilized, then adding more carboxylic acid to the mixture until the pH stabilizes.

5. A method for phosphor recycling as in claim 1, further comprising the steps of:
    estimating an amount of basing cement present from the particles of said step of providing; and
    determining, from said step of estimating, an amount of carboxylic acid to be used in said step of preparing a mixture.

6. A method for phosphor recycling as in claim 1, further comprising the step of screening or sifting the particles to remove larger particles prior to said step of preparing a mixture.

7. A method for phosphor recycling as in claim 6, wherein the larger particles have at least one dimension of about 20 microns or greater.

8. A method for phosphor recycling as in claim 1, wherein the method further comprises a step of providing particles by crushing phosphor coated tubes of fluorescent lamps into a powder.

9. A method for phosphor recycling as in claim 1, further comprising the step of agitating the mixture to create a slurry.

10. A method for phosphor recycling as in claim 1, wherein the basing cement comprises calcium carbonate.

11. A method for phosphor recycling as in claim 10, wherein said step of creating a mixture comprises adding an amount of carboxylic acid sufficient to react with substantially all of the calcium carbonate present in the mixture.

12. A method for phosphor recycling as in claim 1, wherein said step of separating one or more of the phosphors from the mixture comprises applying centrifugal force to the mixture to settle the phosphors.

13. A method for phosphor recycling as in claim 1, wherein said step of separating one or more of the phosphors from the mixture comprises applying a vacuum to the mixture to remove water.

14. A method for phosphor recycling as in claim 1, wherein the phosphors from said step of separating comprises yttrium-europium oxide phosphors; strontium, europium chlorapatite phosphors; barium europium magnesium aluminate phosphors, or combinations thereof.

15. A method for phosphor recycling as in claim 1, further comprising the step of cooling the carboxylic acid before said step of creating a mixture.

16. A method for phosphor recycling as in claim 1, wherein the carboxylic acid comprises at least one of acetic acid, propionic acid, butanoic acid, or mixtures thereof.

17. A method for recovering phosphors from fluorescent lamps, comprising:
    mixing particles created from fluorescent lamps with water to provide a mixture;
    adding carboxylic acid to the mixture while keeping the temperature of the mixture below a predetermined maximum temperature $T_{MAX}$, wherein $T_{MAX}$ is about 30 degrees Celsius; and
    separating one or more phosphors from the mixture.

18. A method for recovering phosphors from fluorescent lamps as in claim 17, wherein said step of adding carboxylic acid comprises adding acetic acid to achieve a concentration of about 1 M acetic acid in the mixture.

19. A method for recovering phosphors from fluorescent lamps as in claim 17, wherein the temperature $T_{MAX}$ is about 25 degrees Celsius or less.

20. A method for phosphor recycling as in claim 17, wherein the temperature $T_{MAX}$ is about 20 degrees Celsius or less.

* * * * *